U. E. COOK.
PLOW.
APPLICATION FILED MAY 27, 1919.
1,388,142.
Patented Aug. 16, 1921.
2 SHEETS—SHEET 1.
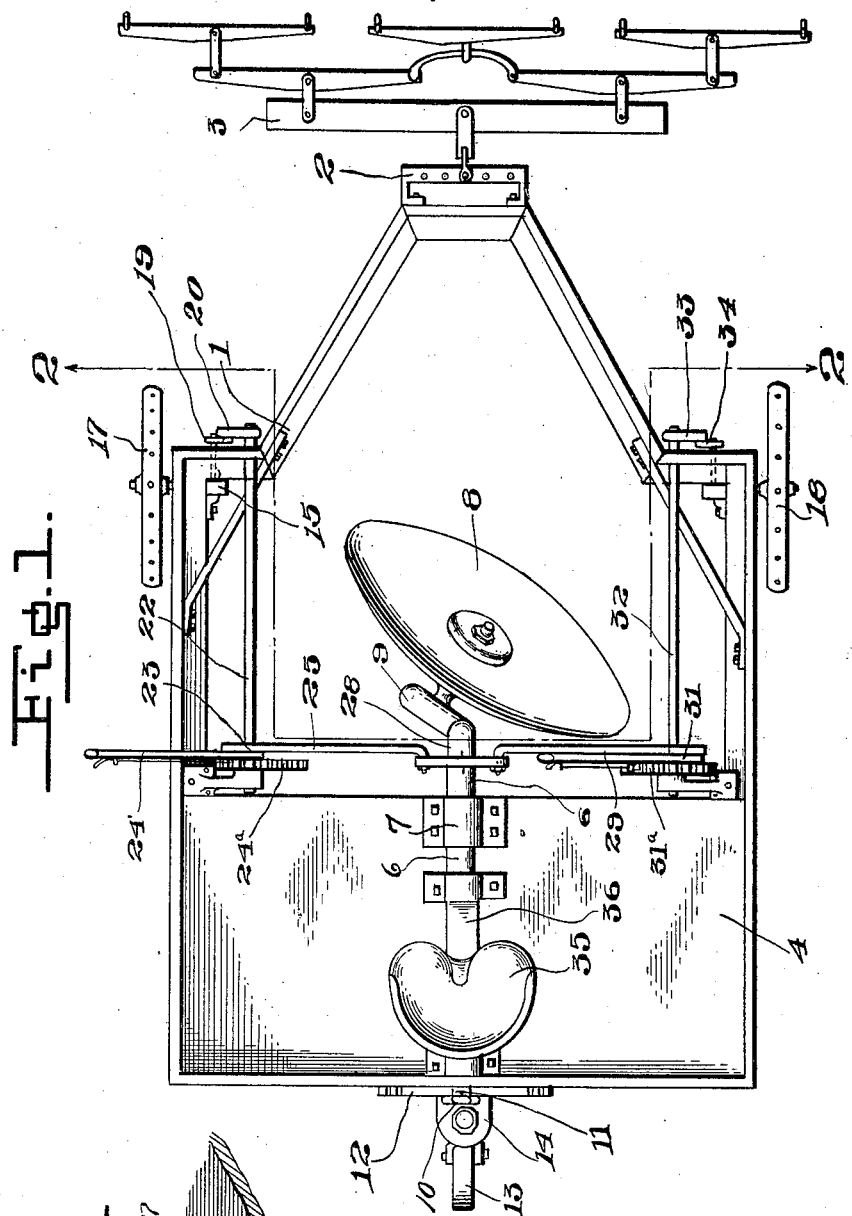
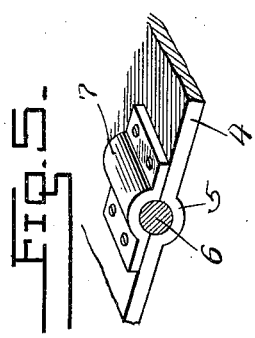
Inventor
U. E. Cook.
By Lancaster and Allwine
his Attorneys

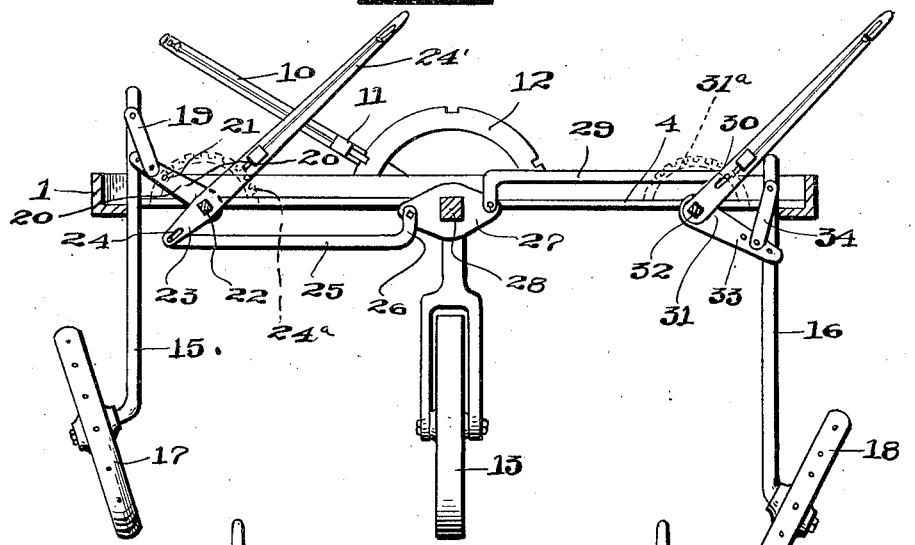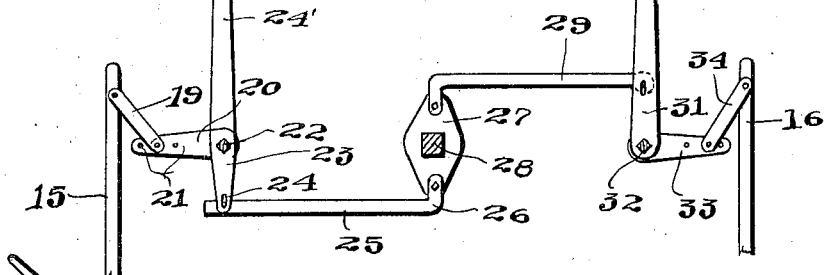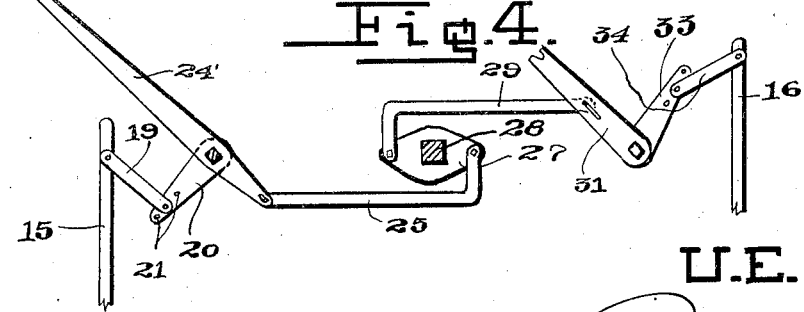

UNITED STATES PATENT OFFICE.

ULYSSES E. COOK, OF POMONA, CALIFORNIA.

PLOW.

1,388,142.

Specification of Letters Patent. Patented Aug. 16, 1921.

Application filed May 27, 1919. Serial No. 300,156.

*To all whom it may concern:*

Be it known that I, ULYSSES E. COOK, a citizen of the United States, and a resident of Pomona, in the county of Los Angeles and State of California, have invented certain new and useful Improvements in a Plow, of which the following is a specification.

This invention relates to breaking or turning plows and the primary object of the invention is to provide a plow structure of this type, including an earth-working or turning implement or tool carried by a suitable rockably supported beam, and also to provide means for rocking the beam to reverse the position of the earth-working tool, for converting the plow into either a right-hand or left-hand plow at will.

The plow is particularly designed for use upon hillsides, but it may be used on relatively flat fields, for straight throwing in both directions across a field, in much the same manner that the ordinary two-way plows are now used.

Another object of the invention is to provide a plow structure as specified including a supporting frame having suitable land and furrow wheels adjustably carried thereby, and to provide means for adjusting said wheels synchronously with the reversing of the position of the plow or earth-working tool.

A further object of this invention is to provide a rockably mounted beam structure having an arcuate portion thereon which carries the earth-turning or working tool, preferably a disk of the ordinary type employed in disk turning plows, which arcuate portion will maintain the disk at the proper angle to the line of travel of the plow in either position thereof.

A still further object of the invention is to provide means for simultaneously moving the tool carrying beam of a gang plow of this nature and at the same time adjusting the positions of the land and furrow wheels in accordance with the reversing of the earth-working tool.

Other objects of the invention will appear in the following detail description, taken in connection with the accompanying drawings, forming a part of this specification, and in which drawings:

Figure 1 is a top plan of the preferred form of the breaking or turning plow.

Fig. 2 is a vertical cross section taken on the line 2—2 of Fig. 1.

Fig. 3 is a fragmentary view illustrating the wheel adjusting mechanism, showing the same in an adjusted position, at which time the land and furrow wheels are on a level for transporting the plow in an inoperative position.

Fig. 4 is a view similar to Fig. 3 showing the wheel adjusting mechanism in position for reversing the positions of the wheels as illustrated in Fig. 2.

Fig. 5 is a perspective view, showing several details of the invention.

Referring more particularly to the drawings, 1 designates the supporting frame of the plow structure, which has the usual type of clevis 2 attached to the forward end of the same to permit lateral adjustable connection between the clevis and the draft tree 3 to which the double and swingle trees are connected in the ordinary manner.

The supporting structure 1 may be constructed of angle iron or any other suitable material and it has a platform 4 secured to the rear portion thereof. The platform 4 is provided with a longitudinally extending centrally disposed depression 5 which forms a bearing for the rockable beam 6 of the plow structure. The beam 6 is confined in the depression 5 by suitable bearing structures 7 of ordinary construction which are attached to the platform 4 in any suitable manner. The beam 6 has its forward end which projects beyond the forward edge of the platform 4 downturned and bent at an angle to the main portion of the beam. A disk 8 of the ordinary construction employed in land turning or breaking plows is carried by the lower downturned angled end 9 of the beam 6.

The rear end of the beam 6 is rectangular in cross section and projects beyond the rear end of the supporting frame 1. A hand lever 10 is mounted upon the rectangular end of the beam 6 and is provided for rotating or rocking this beam to reverse the position of the disk 8, to convert it into either a right or left hand turning plow as desired. The lever 10 carries the usual type of dog mechanism 11 which co-acts with a quadrant 12 for holding the lever and consequently the beam 6 in adjusted position.

A land supporting wheel 13 is swivelly connected to a suitable bracket 14 which projects rearwardly from the rear end of the supporting frame 1.

The supporting frame 1 has standards 15 and 16 adjustably carried thereby, one at each side of the frame and these standards have their lower ends angled, to form spindles which support wheels 17 and 18 respectively. The angling of the lower spindle end of the standard 15 is such as to position the wheels 17 and 18 at oblique angles to the vertical, as has been found desirable in plow structures of this nature. The standard 15 has a link 19 pivotally connected to its upper end which link is in turn pivotally connected to an arm 20. The arm 20 is provided with a plurality of spaced openings 21 to permit of adjustable connection between it and the link 19. The arm 20 is mounted upon a rectangular shaft 22 which extends longitudinally of the frame 1 at one side of the same. The rectangular shaft 22 has an arm 23 mounted thereon which is connected by means of a slot and pin connection as shown at 24 to an arm 25. The arm 23 is formed upon the lower end of a lever 24' which lever is provided for manually adjusting the standard 15 independently of movement of the shaft 6 which carries the plow. A dog mechanism is carried by the lever 24' and co-acts with a quadrant 24ᵃ for locking the lever to permit it to move during the rotation of the shaft 6. The arm 25 extends transversely of the frame 1 and has its inner angled end 26 pivotally connected to one end of a substantially oval plate 27. The substantially oval-shaped plate 27 is mounted upon a rectangular portion 28 of the beam 6 and forwardly of the front edge of the platform 4 as clearly shown in Fig. 1 of the drawings. A second arm or rod 29 is connected to the end of the disk 27 oppositely to the end to which the rod 25 is connected. The arm 29 is connected by means of a slot and pin connection 30 to an arm 31 carried by a rectangular shaft 32. The arm 31 is elongated upwardly from the shaft 32 and forms a lever to permit the operator of the standard 16 independently of operation of the shaft 6. This lever carries a dog mechanism which co-acts with a quadrant 31ᵃ to lock the lever for movement by the movement of the shaft 6. The levers 24' and 31 are provided to permit the adjustment of the wheels when cutting a first or initial furrow across a field. The rectangular shaft 32 extends longitudinally along the side of the frame 1 oppositely from the side along which the shaft 32 extends. This shaft 32 has an arm 33 mounted thereon which is adjustable and pivotally connected to the upper end of the standard 16. It will thus be seen that upon rocking movement of the beam 6 to reverse the angle and position of the land turning disk 8, the disk 27 will also be rocked and move the rods 25 and 29, longitudinally, which will in turn rock the shafts 22 and 32, imparting vertical movement to the standards 15 and 16 through the medium of the connection between the shafts and the standards and thus the relative positions of the wheels 17 and 18 will be reversed; or in other words when the disk 8 is positioned to throw the turned dirt to the right, the wheels 17 will be the land wheel of the plow, riding upon the unplowed surface, while the wheel 18 will be the furrow wheel, riding in the plowed land and when the plow is reversed, these wheels will be also reversed, raising the wheel 18, to convert it into the land wheel and lowering the wheel 17 to convert it into the furrow wheel. This movement is accomplished synchronously with the rocking of the beam 6 as above set forth.

When the lever 10 is positioned vertically, the disk 27 will be arranged as illustrated in Fig. 3 of the drawings, at which time the wheels 17 and 18 will lie in the same plane and the disk 8 will be raised out of an operative position to permit transportation of the plow from one place to another without affecting the dirt or ground surface over which the plow is traveling. The usual type of seat 35 is supported by the usual form of spring standard 36, from the platform 4.

From the foregoing description taken in connection with the accompanying drawings, it will be readily apparent that a land breaking or turning plow has been provided which may be converted into either a right or left-hand plow, at the will of the operator and during the plowing of a field, without extensive changes, or adjustment of parts, this reversing of the position of the plowing or turning element necessitating merely the operation of the hand lever; thus with this plow structure, the operator may, when he reaches one end of a field, reverse the plow and go back across the field, throwing the dirt turned into the furrow formed upon the former trip across the field eliminating the necessity of the employment of separate plow bottoms independently adjustable, for permitting this operation and also providing a breaking or turning plow structure particularly adapted for use upon hillsides, in that all of the turned dirt may be thrown in the same direction. It is to be understood that certain minor features of construction may be altered to suit practical conditions, without departing from the spirit of this invention, provided such alterations are comprehended within the scope of what is claimed.

What is claimed is:

1. In a turning plow, the combination of a supporting frame, a platform carried thereby and being of less length than the frame to provide an opening through the frame, a beam mounted to turn in the opening, a disk carried by the beam, and means for swinging the beam to reverse the angle of the disk.

2. In a turning plow, the combination, of a supporting frame, a platform carried by the rear portion of said frame and provided with a centrally disposed depression, a beam rockably mounted in said depression and having its forward end angled and downturned, an earth-turning disk carried by the downturned angled end of said beam and disposed in an angle to the line of travel of the plow, and means for rocking said beam to reverse the angle of said disk with respect to the line of travel of the plow whereby the disk may be arranged to throw dirt either to the right or to the left.

3. In a turning plow, the combination, of a supporting frame, a platform carried by the rear portion of said frame and having a substantially semi-circular longitudinally extending depression, a beam rockably mounted in said depression, a disk carried at the forward end of said beam and disposed in an angle to the line of the travel of the supporting frame, a hand lever connected to said beam for rocking the beam to reverse the angle of said disk with respect to the line of travel of the frame, whereby the disk may be arranged to throw dirt either to the right or to the left.

4. In a turning plow, the combination, of a supporting frame, a platform carried by the rear portion of said frame and having a substantially semi-circular longitudinally extending depression, a beam rockably mounted in said depression, a disk carried at the forward end of said beam and disposed in an angle to the line of travel of the supporting frame, a hand lever connected to said beam for rocking the beam to reverse the angle of said disk with respect to the line of travel of the frame, whereby the disk may be arranged to throw dirt either to the right or to the left standards adjustably carried by said supporting frame, supporting wheels carried by the lower ends of said standards, and means connecting said standards and said beams for adjusting the elevations of said wheels synchronouly with the reversing of the angle of said disk.

5. In a plow, a supporting structure, a platform carried at the rear thereof, a beam arranged substantially centrally and longitudinally of the platform and mounted for oscillating movement, a disk carried by said beam and adapted to be reversed when the beam is oscillated, means for oscillating said beam, a plate secured to turn with the beam, a pair of links connected to opposite ends of said plate and moving therewith, a pair of parallel shafts arranged at the sides of said frame, hand levers on said shafts for swinging the same, loose connections between said links and hand levers, connections being made respectively at opposite sides of said last-mentioned shafts, arms extending from the forward ends of said shafts, vertically reciprocating standards, links connecting said standards with said arm, and wheel mounted on the lower end of said standards and adapted to be alternately lifted and lowered when the disk is changed from one to the other position.

ULYSSES E. COOK.